United States Patent [19]

Carrier

[11] Patent Number: 5,749,620
[45] Date of Patent: May 12, 1998

[54] TAILGATE ASSEMBLY FOR OPEN TOP LOAD CARRYING CONTAINER

[75] Inventor: Thomas Gordon Carrier, Brookville, Pa.

[73] Assignee: Carlisle Management Company, Syracuse, N.Y.

[21] Appl. No.: 673,613

[22] Filed: Jun. 25, 1996

[51] Int. Cl.⁶ .................................................. B62D 35/00
[52] U.S. Cl. .......................... 296/180.1; 296/50; 296/184
[58] Field of Search ............................. 296/50, 56, 57.1, 296/180.1, 184; 298/23 R, 23 MD

[56] References Cited

U.S. PATENT DOCUMENTS

| | | | |
|---|---|---|---|
| 3,361,476 | 1/1968 | Smock | 298/7 |
| 4,063,772 | 12/1977 | Kincaid | 296/180.1 |
| 4,136,905 | 1/1979 | Morgan | 296/50 |
| 4,372,601 | 2/1983 | Smith | 296/50 |
| 4,585,265 | 4/1986 | Mader | 296/56 |
| 4,743,058 | 5/1988 | Fedrigo | 296/57.1 |
| 5,324,092 | 6/1994 | Burg | 296/180.1 |
| 5,340,184 | 8/1994 | Conrado | 296/50 |
| 5,397,172 | 3/1995 | Musso, Jr. et al. | 298/22 R |
| 5,435,616 | 7/1995 | Comer | 296/180.1 |

*Primary Examiner*—Andrew C. Pike
*Attorney, Agent, or Firm*—Bond, Schoeneck & King, LLP

[57] ABSTRACT

A tailgate assembly for an open top load carrying container includes a tailgate for assuming the traditional closed and open configuration for dumping material from the container. The tailgate includes a venting aperture selectively closeable by a venting door movable between a closed and an open position, such that a substantial portion of the venting door is disposed within the container in the open position.

12 Claims, 4 Drawing Sheets

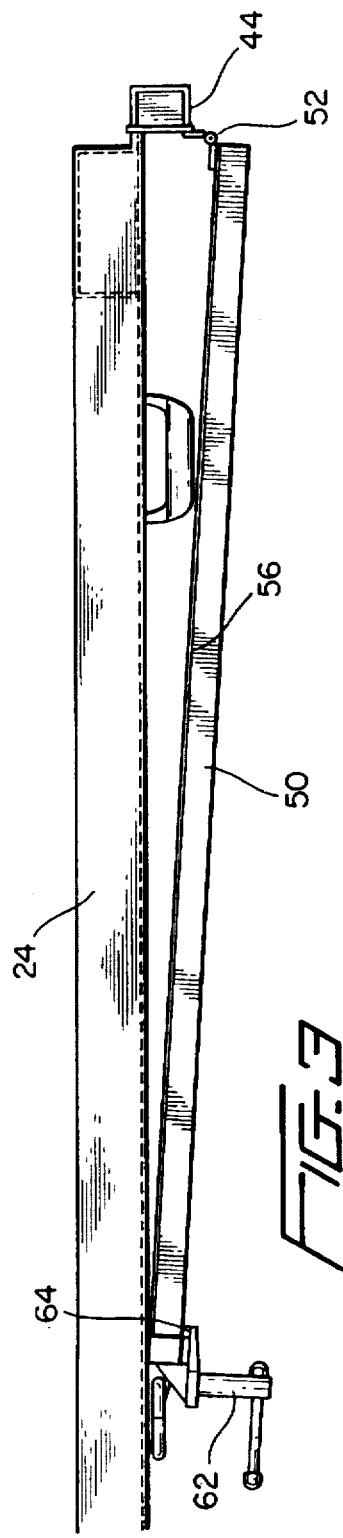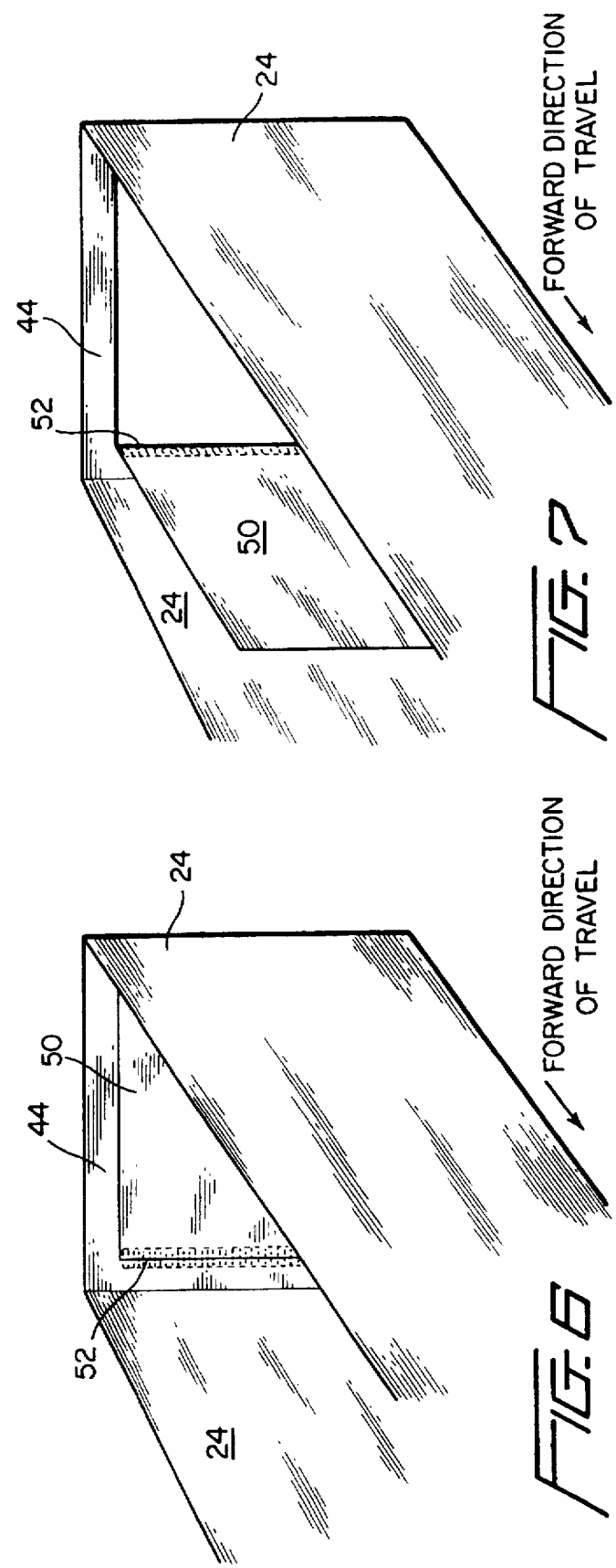

5,749,620

1

TAILGATE ASSEMBLY FOR OPEN TOP LOAD CARRYING CONTAINER

FIELD OF THE INVENTION

The present invention relates to a tailgate assembly for an open top load carrying container such as a truck or trailer, and more particularly, to a tailgate assembly having an apertured tailgate frame movable between traditional open and closed positions with respect to the container and a door movably connected to the tailgate frame for movement between a closed position to substantially preclude passage through the aperture and an open position to dispose the door substantially within the container.

BACKGROUND OF THE INVENTION

Open top containers are frequently used for transporting materials. When the containers are full, the material prevents any substantial air flow from entering the container. However, when an empty open top container is in motion, air enters the container and acts against the inside or front of the rear of the container. As tailgates often define the rear of the containers, the tailgates act as a large air dam and create a substantial resistance to motion of the container. When such containers are transported by trucks or trailers this drag increases fuel consumption of the vehicle and adversely affects performance.

A number of efforts have been made to reduce the drag of a closed tailgate in an empty open top container. These efforts have included increasing the aerodynamic configuration of the tailgate. Specifically, U.S. Pat. No. 4,063,772 to Kincaid discloses a tailgate vent through which the passage of air is permitted, in combination with a material shield positioned in the compartment extending downwardly from above the vent opening to adjacent the bottom of the vent opening for preventing material in the compartment from moving through the opening.

U.S. Pat. No. 4,585,265 to Mader discloses a tailgate movable between the conventional closed (vertical) position, the conventional open horizontal position, wherein the tailgate pivots about its lower edge on a horizontal axis to become substantially coplanar with the adjacent portion of the bed; and a third aerodynamic position wherein the tailgate is elevated and slid forward relative to the end of the bed.

U.S. Pat. No. 5,435,616 to Corner discloses a truck bed air flow director having an inclined surface for directing air flow from the compartment up and over a vertically oriented tailgate.

The need still exists for a tailgate assembly in an open top load carrying compartment or dump body which allows an operator to configure the system in a relatively aerodynamic configuration. The need exists for a tailgate assembly that allows a tailgate, including large tailgates, to be readily disposed in a relatively aerodynamic configuration when the compartment is empty. The need also exists for a relatively aerodynamically configurable tailgate assembly which can maintain the integrity of the compartment when hauling material.

SUMMARY OF THE INVENTION

The present invention provides a tailgate assembly for an open top load carrying container, wherein the tailgate assembly is configurable between a closed hauling or transport configuration and an open aerodynamic configuration. Generally, the present invention encompasses a tailgate

2 assembly movable between the conventional closed vertical and open horizontal positions, wherein the tailgate assembly of the present invention is positionable to a relatively aerodynamic position such that a substantial portion of the tailgate assembly is disposed within the container.

In a preferred embodiment, the tailgate assembly includes a tailgate frame movably connected to the container between an open and closed position by rotation about a substantially horizontal axis. The tailgate frame includes a venting aperture. A venting door is movably connected to the tailgate frame to be moveable between a closed position and an open position which is substantially within the container.

BRIEF DESCRIPTION OF THE DRAWINGS

FIG. 3 is a top plan view showing the tailgate assembly in the aerodynamic configuration.

FIG. 6 is a schematic perspective view showing a tailgate assembly in a closed configuration.

FIG. 7 is a schematic perspective view showing a tailgate assembly in an aerodynamic configuration.

DETAILED DESCRIPTION OF THE PREFERRED EMBODIMENT

Figure 1:
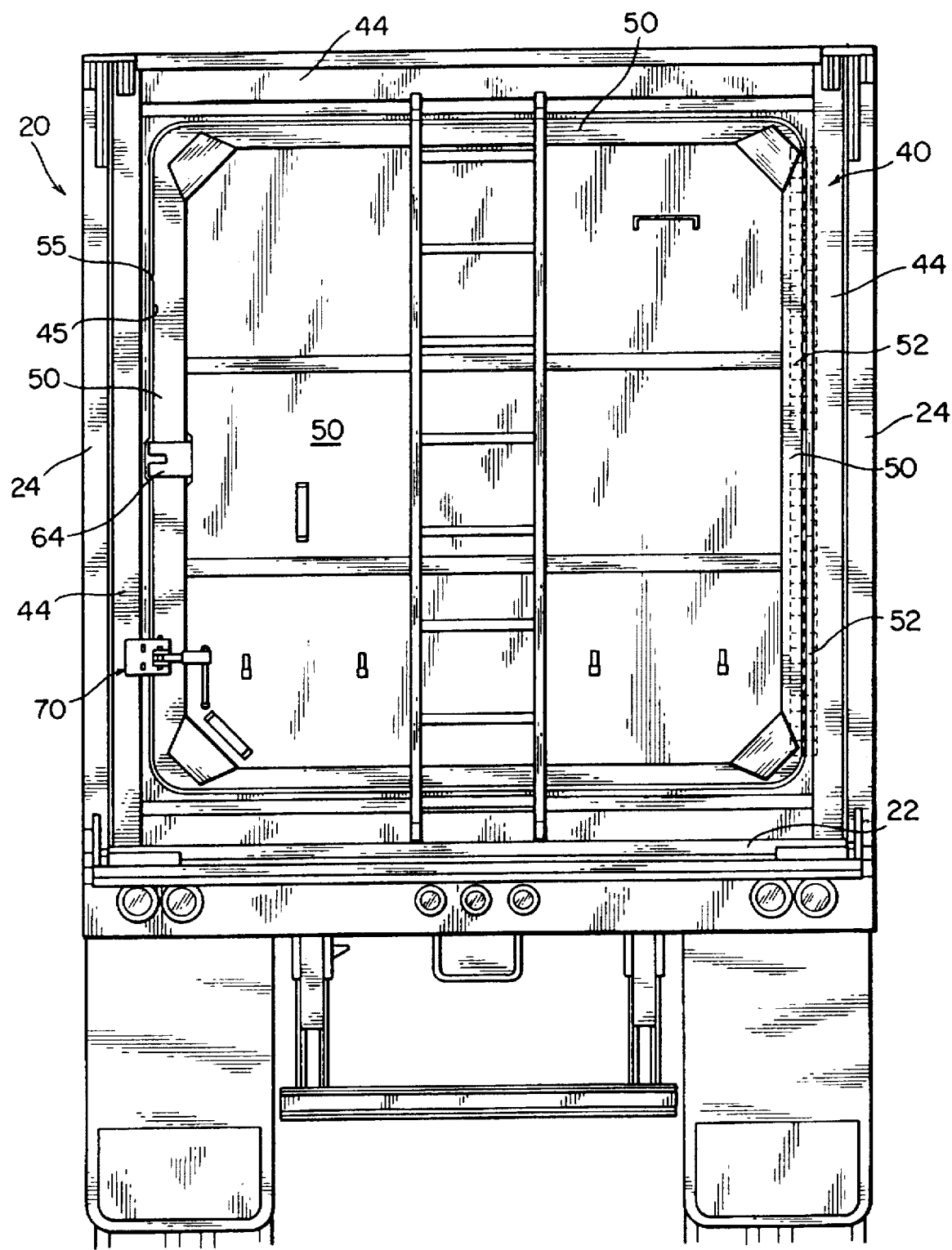
FIG. 1 is a rear view of the tailgate assembly in a traditional closed configuration.

Referring to FIG. 1, the present invention is employed in an open top load carrying container 20. The container 20 may be wheeled as a dump body on a truck, or a trailed or trucked dump body. Alternatively, the container 20 may be separate from a given wheel assembly to be operably connected to a second wheel assembly. In addition, the open top configuration may include a completely open top or a partially covered top. That is, portions of the container 20 may be covered. The container is sufficiently open such that an air flow is permitted to enter the open top of the container 20 and contact the interior of the container to create a resistance to movement.

As shown, the load carrying container 20 includes a bottom 22 which may be a substantially planar rectangular bed, parallel upstanding sidewalls 24 extending from the longer dimensions of the bottom which may be planar or configured, and a front wall 26 (not shown in drawings) which may be planar or configured. These walls are attached to each other to form a portion of the container 20. The tailgate assembly 40 forms a portion of the container 20 to complete the open top container, thereby forming an interior and an exterior to the container. The container 20 may include a rear wall which cooperates with the tailgate assembly 40. Alternatively, as shown, the tailgate assembly 40 may substantially form the rear end of the container 20. In the closed position, the bottom wall 22, sidewalls 24, front wall 26, and tailgate assembly 40 form an open top container 20 having an interior and an exterior.

Figure 4:
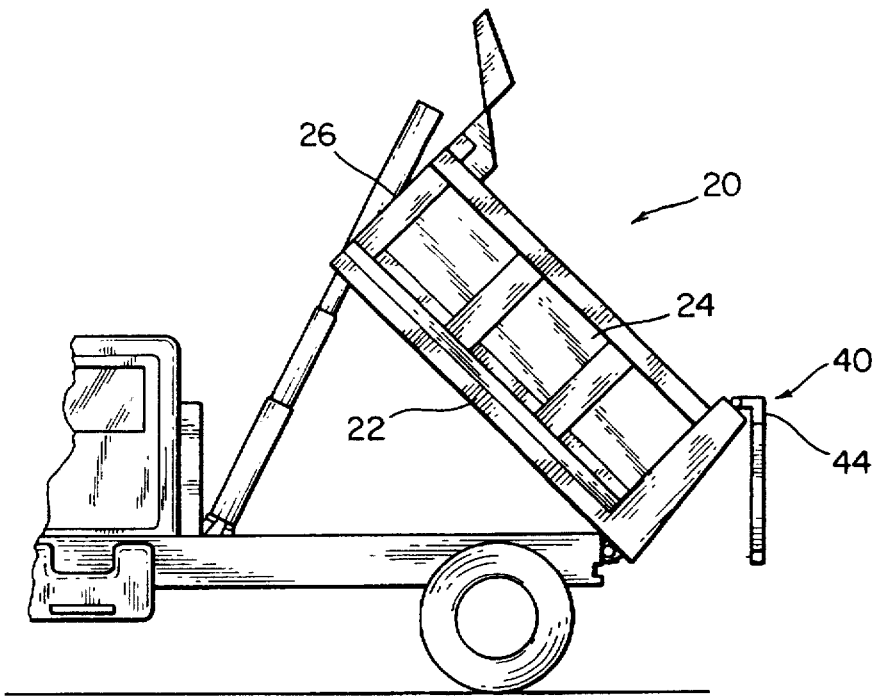
FIG. 4 is a schematic view showing the tailgate assembly in a traditional open position.

The tailgate assembly 40 includes a first portion, shown as a tailgate frame 44 rotatably mounted to the sidewalls 24 and/or the bottom wall 22 to be movable between the conventional closed position as shown in FIG. 1, and an open position as shown in FIG. 4. In this open position, the tailgate frame 44 and hence assembly 40 rotate about its upper edge to allow the lower edge to rotate away from the rear end of the bottom wall 22.

Figure 5:
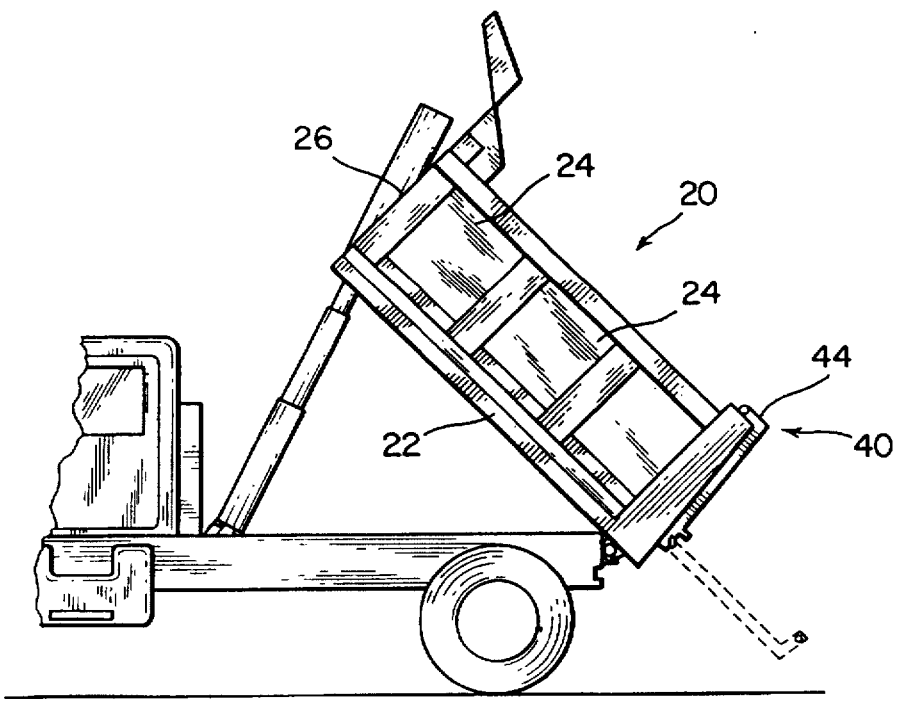
FIG. 5 is a schematic view showing a tailgate assembly in a second traditional open position.

Alternatively or additionally, as shown in FIG. 5 the tailgate frame 44 and hence assembly 40 may be rotatable about a second horizontal axis to provide a continuation of the bottom wall 22. In this configuration the tailgate assembly 40 forms a platform projecting from the rear of the container 20. That is, the tailgate frame 44 is moveable between a closed position defining a portion of the container sidewall and an open position substantially exterior to the container.

The tailgate frame 44 includes a venting aperture 45. Although the periphery of the venting aperture 45 may be any of a variety of shapes, the venting aperture is preferably a square periphery within the tailgate frame.

A venting door 50 is hingably attached to the tailgate frame 44. A piano hinge 52 is used to connect the venting door 50 to the tailgate frame 44. The hinge 52 is located on the container 20 so that the venting door 50 may swing into the interior of the container. Although shown as hingably attached about a substantially vertical axis for ease of movement, it is contemplated the venting door 50 may be attached about a horizontal axis. Thus, the hinge 52 may have a substantially horizontal axis of rotation.

The venting door 50 is thus movably connected to the tailgate frame 44 between a closed position and an open position. In the closed position the tailgate frame 44 and the venting door 50 form a substantially continuous surface and function as a traditional tailgate. In the open position, the venting door 50 is disposed substantially within the container 20. That is, the venting door 50 swings inwardly into the interior of the container, while the tailgate frame remains in the traditional closed position.

Figure 2:
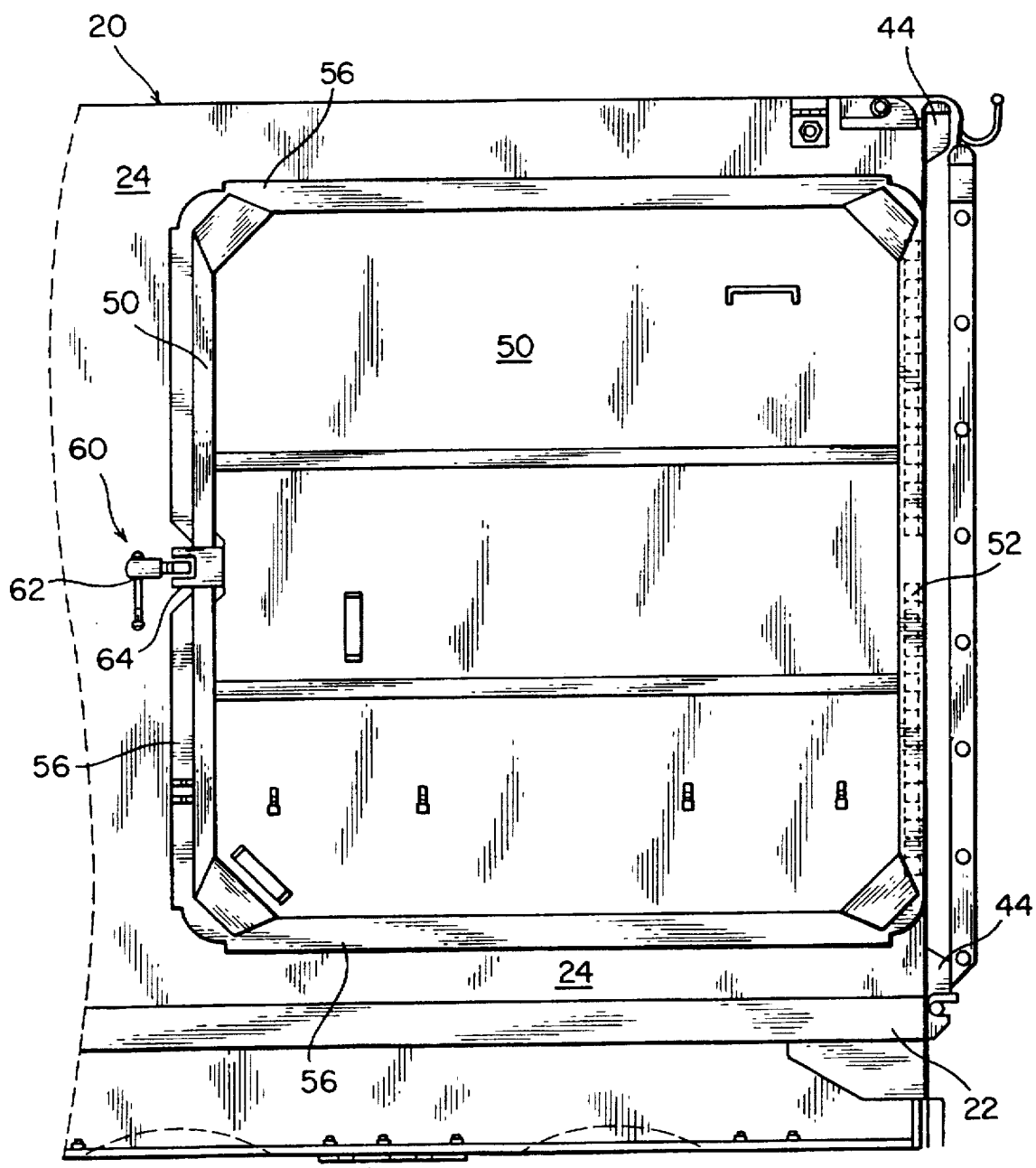
FIG. 2 is a side elevational view showing a portion of the tailgate assembly disposed in the interior of the compartment.

The venting door 50 includes peripheral flanges 56 as shown in FIGS. 2 and 3, sized to overlap a junction or gap 55 between the venting door and the tailgate frame 44. The flanges 56 are sized to cover any gap between the venting door 50 and the aperture periphery. The flanges 56 may be integral with the door 50 or fastened to the door by rivets, welds, or other mechanical fasteners. The flanges 56 assist in forming a substantially continuous surface between the venting door 50 and the tailgate frame 44 in the closed position of the venting door. As the venting door 50 is moved from the open to the closed position, the flanges 56 occlude the intermediate gap 55 and make contact with the adjacent interior surface of the tailgate frame 44.

A venting latch 60 having corresponding components on the interior of the container 20 and the venting door 50 is employed to selectively retain the venting door in the open position. The latch 60 releasably engages the venting door with the interior of the container to preclude unintended closure. As shown in FIG. 2, the latch includes an adjustable clasp 62 on the interior of the container 20. The venting door 50 includes a corresponding surface 64 to cooperatively engage the clasp 62. The latch 60 may be operably located to releasably retain the venting door 50 in the open position upon rotation of the venting door about a vertical hinge 52 or a horizontal hinge.

A closing latch 70 is disposed on the tailgate frame 44 and venting door 50 to releasably retain the venting door in the closed position with respect to the tailgate frame.

It is contemplated that the tailgate assembly 40 may include a plurality of venting doors 50 for selectively closing a venting aperture 45; a plurality of venting apertures 45 and corresponding venting doors 50; or a plurality of venting apertures 45 and a single venting door 50 to occlude the apertures. Multiple doors may each be cooperatively associated with a unique aperture, or may cooperate in a single aperture. The venting doors 50 may engage an adjacent door or an adjacent portion of the tailgate frame 44 to be retained in the closed position. In addition, corresponding latches may be added to retain the inwardly swinging venting doors 50 in the open position.

Alternatively, the venting doors may each have a relatively reduced size. Preferably, the present venting aperture 45 has an area of at least 50% of the tailgate assembly 40, or rear end of the container. Subject to structural constraints, the aperture may be over 90% of the entire area of the tailgate.

OPERATION

For transporting material in the interior of the container 20, the venting door 50 is disposed and latched by latch 70 in the closed position to form a substantially continuous surface with the adjacent tailgate frame 44. The open top load carrying container functions in its traditional sense for hauling material.

To dump material from the container 20, the tailgate frame 44 and venting door 50 remain as a single unit as the tailgate frame is pivoted about the upper horizontal axis to allow the material to be spilled as the bottom wall 22 is tilted.

Upon voiding the material from the container 20, the tailgate frame 44 is latched in its closed configuration. The latch 70 is then released and the venting door 50 swung inward away from the tailgate aperture 45 to cooperatively engage the corresponding latch 60 in the interior of the container 20. Substantially the entire venting door 50 is thus disposed in the interior of the container 20. Preferably, the venting door 50 assumes a substantially parallel orientation with respect to the adjacent container wall. As the venting door 50 pivots about a vertical axis, the venting door is readily moveable to the interior of the container as the center of mass of the venting door remains in a given elevation. That is, the present invention maintains the center of mass of the tailgate assembly and venting door at a constant vertical elevation. Therefore, a single operator may readily dispose the tailgate assembly (and container) into a relatively aerodynamic configuration.

As the container thus experiences air flow, the air may pass into the container through the open top and outwardly through the substantially unobstructed venting aperture.

While the invention has been described in connection with what is presently considered to be the most practical and preferred embodiments, it is to be understood that the invention is not to be limited to the disclosed embodiment, but on the contrary, is intended to cover various modifications and equivalent arrangements included within the spirit and scope of the appended claims which scope is to be accorded the broadest interpretation so as to encompass all such modifications and equivalent structures.

I claim:

1. A moveable material transporting assembly for movement in a forward direction, the transporting assembly comprising:

(a) a wheel assembly for rolling engagement with a support surface;

(b) an open top container connected to the wheel assembly, the container having an interior and an exterior partially defined by a rear end;

(c) a tailgate assembly in the rear end, the tailgate assembly including a tailgate frame having a venting opening;

(d) an interconnect structure interconnecting the tailgate frame and the container to dispose the tailgate frame in one of a frame closed position and a frame open position substantially exterior to the container; and (e) a door pivotally connected about an upright axis to the tailgate frame, the door being movable between a door closed position precluding passage through the venting opening and a door open position substantially within the container to permit passage through the venting opening.

2. A tailgate assembly for an open top load carrying container, the tailgate assembly comprising:

(a) a tailgate frame movably connected to the container between a frame open position and a frame closed position, the tailgate frame having a venting opening; and (b) a venting door connected to the tailgate frame and movable about a substantially vertical axis between a door closed position occluding the venting opening and a door open position substantially within the container.

3. The tailgate assembly of claim 2, wherein the venting door is substantially parallel to a container wall in the door open position.

4. The tailgate assembly of claim 2, further comprising a latch on an interior of the container for releasably engaging the venting door to retain the venting door in the door open position.

5. The tailgate assembly of claim 2, further comprising a hinge connecting the venting door and the tailgate frame to movably connect the venting door to the tailgate frame.

6. A tailgate assembly for a load carrying container, the tailgate assembly comprising:

(a) a first tailgate portion connected to the container movable between a first position to define an interior and an exterior of the container and a second position substantially outside the container, the first tailgate portion having an aperture; and (b) a second tailgate portion pivotally connected about a vertical axis to the first tailgate portion, the second tailgate portion being movable between a first position substantially adjacent the first portion to occlude the aperture and a second position substantially within the interior of the container to permit passage through the aperture.

7. A dump body, the dump body comprising:

(a) a bottom;

(b) a sidewall connected to the bottom and extending upwardly to form an open top container defining an interior; and (c) a gate assembly connected to the sidewall, the gate assembly being moveable between a gate open position and a gate closed position and having a venting opening therein, the gate assembly including a subdoor moveable between a subdoor open position and a subdoor closed position about a vertical axis, the subdoor substantially occluding the venting opening in the subdoor closed position and being disposed substantially within the interior in the subdoor open position.

8. The dump body of claim 7 further comprising a latch on the interior of the container to releasably retain the subdoor in the subdoor open position.

9. A method of configuring a dump body, the method comprising:

(a) disposing a gate assembly moveable between a gate open position substantially exterior to the dump body and a gate closed position into the gate closed position; and (b) opening a venting opening in the gate assembly by moving a door about a substantially vertical axis from a door closed position occluding the venting opening to a door open position to locate the door substantially within the dump body.

10. The method of claim 9 further comprising releasably securing the door in the door open position to preclude unintended movement of the door from within the dump body.

11. A tailgate assembly for an open top load carrying container, the tailgate assembly comprising:

(a) a tailgate frame movably connected to the container between a frame open position and a frame closed position, the tailgate frame having a venting opening over at least 50% of the tailgate frame; and (b) a venting door connected to the tailgate frame, the venting door being movable about a substantially vertical axis between a venting door closed position occluding the venting opening and a venting door open position substantially within the container.

12. A moveable material transporting assembly for movement in a forward direction, the transporting assembly comprising:

(a) a wheeled frame for rolling engagement with a support surface;

(b) an open top container movably connected to the frame between a transport position and an inclined dump position, the container having an interior and an exterior partially defined by a rear end;

(c) a tailgate assembly in the rear end, the tailgate assembly including a tailgate frame having a venting opening;

(d) an interconnect structure interconnecting the tailgate frame and the container to dispose the tailgate frame in one of a frame closed position and a frame open position substantially exterior to the container; and (e) a door pivotally connected about an upright axis to the tailgate frame, the door being movable between a door closed position precluding passage through the venting opening and a door open position substantially within the container to permit passage through the venting opening.

\* \* \* \* \*

UNITED STATES PATENT AND TRADEMARK OFFICE
CERTIFICATE OF CORRECTION

PATENT NO. : 5,749, 620
DATED : May 12, 1998
INVENTOR(S) : Thomas G. Carrier

It is certified that error appears in the above-identified patent and that said Letters Patent is hereby corrected as shown below:

Title page, insert the following item:
--[60] Provisional application No. 60/015,048, Apr. 9, 1996.--.

Column 1, line 3, insert the following:
--CROSS REFERENCE TO RELATED APPLICATION
Reference is made to and priority claimed from U.S. provisional application Ser. No. 60/015,048, filed Apr. 9, 1996, entitled TAILGATE ASSEMBLY FOR OPEN TOP LOAD CARRYING CONTAINER.--.

Signed and Sealed this

Thirteenth Day of October 1998

Attest:

BRUCE LEHMAN

*Attesting Officer*  *Commissioner of Patents and Trademarks*